(12) United States Patent
Heywood

(10) Patent No.: US 8,140,387 B2
(45) Date of Patent: Mar. 20, 2012

(54) CUSTOMER RETENTION SYSTEMS AND METHODS

(75) Inventor: Chaun P. Heywood, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1270 days.

(21) Appl. No.: 11/050,905

(22) Filed: Feb. 3, 2005

(65) Prior Publication Data

US 2006/0173739 A1 Aug. 3, 2006

(51) Int. Cl.
*G06K 5/00* (2006.01)
*G06F 17/60* (2006.01)

(52) U.S. Cl. .......... 705/14.32; 705/36; 235/380

(58) Field of Classification Search ........ 705/14, 705/35, 1, 34, 36, 38, 14.17, 39, 14.32; 235/379, 235/380; 397/115.01
See application file for complete search history.

(56) References Cited

U.S. PATENT DOCUMENTS

| | | | | |
|---|---|---|---|---|
| 4,823,265 A * | 4/1989 | Nelson | ............... | 705/35 |
| 5,025,372 A * | 6/1991 | Burton et al. | ............... | 705/14 |
| 6,014,641 A * | 1/2000 | Loeb et al. | ............... | 705/34 |
| 6,018,718 A * | 1/2000 | Walker et al. | ............... | 705/14 |
| 6,332,124 B1 * | 12/2001 | Loeb et al. | ............... | 705/1 |
| 6,761,311 B1 | 7/2004 | Algiene et al. | | |
| 6,799,720 B2 * | 10/2004 | Hogan et al. | ............... | 235/380 |
| 6,820,802 B2 * | 11/2004 | Biggar et al. | ............... | 235/379 |
| 7,630,935 B2 * | 12/2009 | Loeger et al. | ............... | 705/39 |
| 2001/0027413 A1 * | 10/2001 | Bhutta | ............... | 705/14 |
| 2002/0069150 A1 * | 6/2002 | Ni | ............... | 705/36 |
| 2003/0061093 A1 * | 3/2003 | Todd | ............... | 705/14 |
| 2003/0115100 A1 * | 6/2003 | Teicher | ............... | 705/14 |
| 2003/0158818 A1 | 8/2003 | George et al. | | |
| 2003/0183686 A1 * | 10/2003 | Prendergast et al. | ............... | 235/380 |
| 2003/0187781 A1 | 10/2003 | Goodman et al. | | |
| 2004/0015394 A1 * | 1/2004 | Mok et al. | ............... | 705/14 |
| 2004/0073511 A1 | 4/2004 | Beaumont et al. | | |
| 2004/0128236 A1 * | 7/2004 | Brown et al. | ............... | 705/39 |
| 2004/0148239 A1 | 7/2004 | Albee et al. | | |
| 2005/0065877 A1 * | 3/2005 | Cleary et al. | ............... | 705/39 |
| 2005/0163297 A1 * | 7/2005 | Ise et al. | ............... | 379/115.01 |
| 2008/0021813 A1 * | 1/2008 | Simpson et al. | ............... | 705/38 |

OTHER PUBLICATIONS

New Executive Gold Star Membership—New Signup, p. 1 (Member Benefits and Costco Services)(1998-2011).*
Costco.com new Executive membership (1998-2011 Costco Wholesale Corporation).*
Author Unknown, "New Executive Business Membership—New Signup", Costco.com, Internet Archive WayBackMachine.org, http://replay.waybackmachine.org/20041206071810/http://www.costco.com/Browse/Product.aspx?Prodid=3167&whse=&topnav=&cat=503&hierPath=503*, Dec. 2002, 2 pages.

(Continued)

*Primary Examiner* — John Weiss
*Assistant Examiner* — Marilyn G Macasiano
(74) *Attorney, Agent, or Firm* — Kilpatrick Townsend & Stockton, LLP

(57) ABSTRACT

A method of communicating a renewal incentive for an expiring account to a user of the account. The method includes the steps of identifying a renewal date for the account with a host computer, and calculating whether the account qualifies for the renewal incentive based on account history accessible by the computer. The method also includes sending renewal data to the user about the renewal date, and the renewal incentive, for the account. The renewal incentive is effective upon renewal of the account, and the renewal incentive includes an enhancement over a current feature for the account.

20 Claims, 4 Drawing Sheets

OTHER PUBLICATIONS

Author Unknown, "2% Annual Review—How to Qualify", Costco.com, Internet Archive WayBackMachine.org, http://replay.waybackmachine.org/20041205161542/http:/www.costco.com/Service/FeaturePage.aspx?ProductNo=10045009, Dec. 2002, 1 page.

Author Unknown, "2% Annual Reward—Terms", Costco.com, Internet Archive WayBackMachine.org, http://replay.waybackmachine.org/20041211174818/http:/www.costco.com/Service/FeaturePage.aspx?ProductNo=10045010, Dec. 2002, 1 page.

* cited by examiner

CUSTOMER RETENTION SYSTEMS AND METHODS

BACKGROUND OF THE INVENTION

The present invention relates generally to systems and methods of retaining holders of an account. More specifically, the invention includes systems and methods to determine and report incentives that will encourage customers to upgrade or resubscribe to the account.

Customers of transaction services, such as financial services, retail and vendor services, loyalty services, etc., receive almost daily solicitations through mail, email, and telephone trying to convince them to switch to a competing service. Industry standardization and technological advances, such as nearly ubiquitous secure Internet access, have also made it easier than ever for customers to switch service providers. These and other factors are causing increasing levels of customer turnover (also known as customer churn), and have created a need for effective methods and systems to retain and resubscribe existing customers.

One way service providers try to attract customers is through incentive programs. Many credit card issuers, for example, have incentive programs that offer new customers a lower interest rate on balances for the first six months. They may also offer a lower initial rate on balances being transferred from a competing credit card company. Service providers also have rewards programs for retaining customers and encouraging them to use the service. Rewards programs may include cash back programs that offer customers a percentage their money back (e.g., 0.5% to 2%) on transactions conducted with the card. Similar programs exist for frequent flier miles, merchandize coupons, hotel discounts, etc.

In the current competitive environment, customers have grown accustomed to checking and re-checking the advantages of competing incentive and rewards programs. New programs are introduced with increasing frequency, forcing providers to update their programs with more regularity to prevent customers from defecting. Thus, there is a need for methods and systems that allow providers to update incentive and rewards programs quickly and rapidly communicate the update to their customers.

One point when customers are particularly susceptible to switching service providers is when their current service reaches a scheduled termination and/or renewal time. These events often prompt customers to do some comparison shopping between the incentive and rewards programs they currently have with those offered by other providers. An existing provider who does not regularly update these programs to match a competitor's program risks losing a renewing or resubscribing customer. Thus, there is a need for methods and systems that can quickly communicate updated incentive and rewards programs to renewing and resubscribing customers.

BRIEF SUMMARY OF THE INVENTION

Embodiments of the invention relate to methods of communicating a renewal incentive for an expiring account to a user of the account. The methods may include the steps of identifying a renewal date for the account with a host computer, and calculating whether the account qualifies for the renewal incentive based on account history accessible by the computer. The methods may also include sending renewal data to the user about the renewal date, and the renewal incentive, for the account. The renewal incentive is effective upon renewal of the account, and the renewal incentive includes an enhancement over a current feature for the account.

Embodiments of the invention also relate to methods of calculating reward levels in a host computer system operable to access account data associated with an account user. The methods may include the steps of dividing a length of time into a plurality of segments, including a first segment and a second segment, and calculating a first and second reward level, where the second reward level is greater than the first reward level. The methods may further include associating the first reward level with the first segment, and the second reward level with the second segment, and communicating, to the account holder, reward data comprising the first reward level associated with the first segment and the second reward level associated with the second segment.

Embodiments of the invention may also relate to methods of calculating a renewal reward in a host computer system operable to access account data associated with an account user. The methods may include the steps of determining a renewal date for an account from the account data, and determining whether the account has a current reward. The methods may further include calculating a renewal reward for the account that is larger than the current reward, and communicating renewal information to the account user, where the information includes information about the renewal reward.

Embodiments of the invention may further relate to methods of providing improved reward information to a customer of a service. The methods may include the steps of receiving information about a first reward, and determining if customer qualifies an improved reward that is equal to greater than the first reward. The methods may also include reporting to the customer an eligibility to receive the improved reward.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Figure 1:
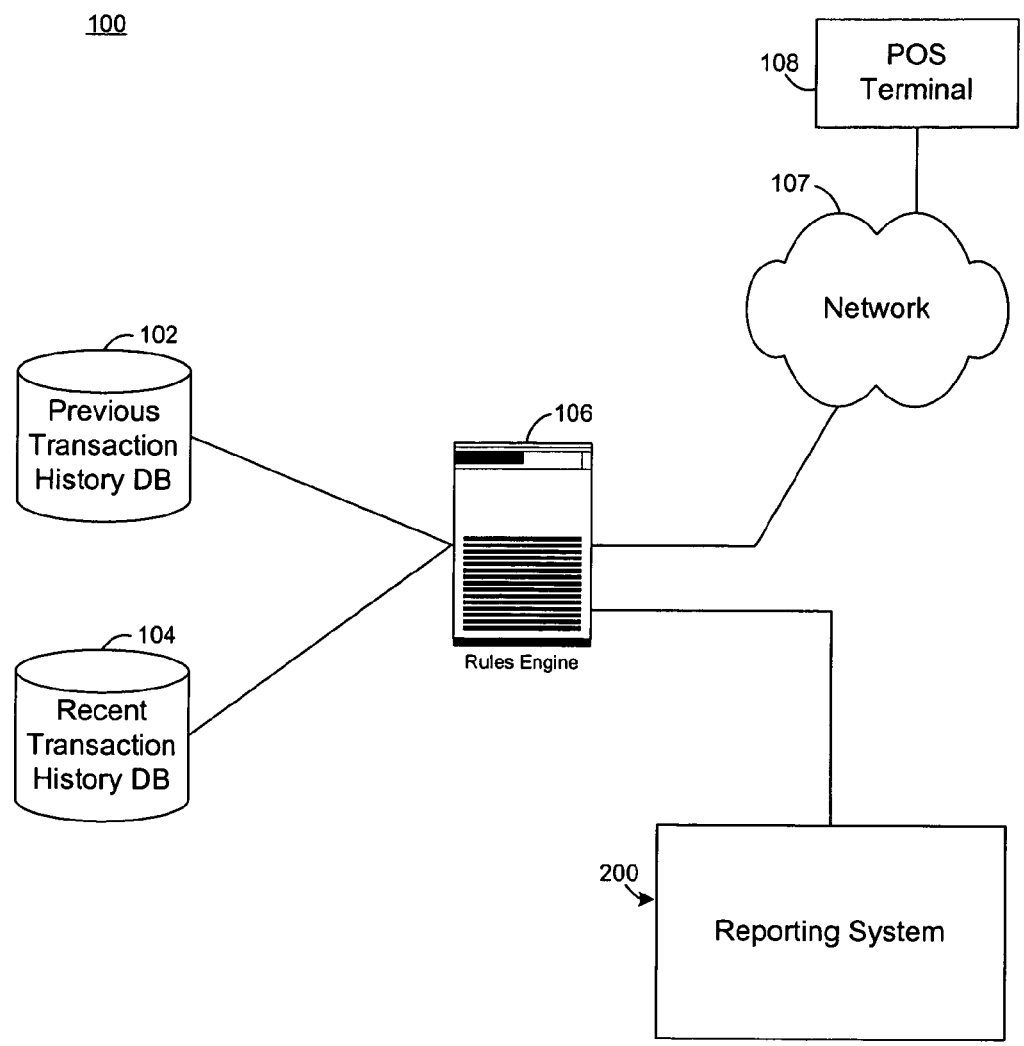
FIG. 1 is a block diagram representation of a system for increasing account holder retention and resubscription rates according to embodiments of the invention.

The present invention relates to systems and programs that increase retention and resubscription rates of the account holders of payment services. These services may include financial services such as credit card services, debit card services, stored-value card services, commercial loan services, merchant and vendor payment services, utility payment services, and loan payment services, including mortgage payment services, among others. These services may also include loyalty services that establish accounts for loyalty and rewards programs. For example, the account may be established for a loyalty enhancement program that periodically increase a reward level for account holders who regularly use the service over a long period of time.

The invention also relates to programs for giving existing account holders a renewal incentive for renewing or resubscribing with the account provider. The renewal incentive may include one or more enhancements over current features of the account that will take effect when the account holder renews or resubscribes with the account provider. These enhancements may include reducing or eliminating an annual fee for the account, lowering an interest rate on a balance owed in the account by the account holder, increasing the number of reward points received per unit of currency (e.g., dollar) transacted with the account, increasing a cash-back percentage of money transacted with the account, rebating or discounting costs of a goods and/or services purchased with the account, and providing loyalty points, gifts, and/or other rewards to the account holder, among other renewal incentives. Information about the renewal incentive may be sent to the account holder around the time of the account expiration date, along with other renewal data. Embodiments of the program may include changing or increasing the renewal incentives from one account term to the next to enhance longer term account holder loyalty, and reduce the chances that the account holder will switch to competing service providers at the renewal/resubscription date.

The invention also relates to calculating a renewal incentive based on the account history. For example, the renewal incentive may be calculated based on the account holder's account payment history, account transaction history (e.g., the size and frequency of transactions conducted with the account), credit history (e.g., the account holder's current FICO score), and loyalty history (e.g., length of time the account holder has held the account), among other aspects of the account history.

Renewal incentives may be designed to facilitate desirable account holder behavior beyond renewing/resubscribing with the account provider. For example, the renewal incentive may be structured to increase a cash back reward level when the account holder maintains a threshold activity level in the account for a specified period of time. For example, a renewal incentive for a credit card account may provide for increasing an annual cash-back percentage (e.g., an increase from 1% to 2% cash back) for account holders who have used the account for at least $X worth of transactions the previous year.

In another example, the renewal incentive may be structured to increase the loyalty points earned per unit of currency transacted (e.g., increasing a loyalty reward rate from 1 loyalty point/dollar to 1.5 loyalty points/dollar) for account holders who have met a threshold transaction volume for a prior time period. Alternatively (or in addition) the increased loyalty reward rate may be automatically instated when the transaction balance in the account meets a threshold level.

In still another example, the renewal incentive may be structured to give account holders incentives to make regular payments on their outstanding account balance. For example, the incentive may provide for periodically enhancing an interest rate reduction for account holders who pay off a threshold cash amount of their outstanding balance for a consecutive number of statement periods. For example, account holders who pay off at threshold amount in each statement period of a given year will have the interest rate on their outstanding balance drop by 1% in the following year.

Dynamic incentives that can change in response to account holder behavior over the course of the renewal period may give account holders motivation to use the card often enough to meet the transaction activity threshold, and also reduce the chance that the card holder will switch to another credit card having a higher reward rate in the short term. For example, account holders who currently has a 1% cash back rate, will be less inclined to switch to a different credit card offering a 2% cash back rate when they know they can receive a 3%, 4%, and even 5% cash back rate in future years if they keep using the existing card.

Referring now to FIG. 1, embodiments of a system 100 according to the invention are described for implementing these and other programs. The system 100 includes a computer database 102 that stores an account holder's previous account status and transaction history for one or more accounts. These accounts may include credit card accounts, debit card accounts, stored value card accounts, mortgage payment accounts, auto loan payment accounts, bank accounts, commercial loan accounts, merchant and vendor payment accounts, and utility payment accounts, among other accounts. The accounts may be created and/or maintained by one or more service providers. Transaction history from multiple service providers should comply with federal, state and provider privacy regulations, such as permission from the account holder to store the data together on database 102.

The system 100 may also include an electronic database 104 that stores more recent account status and transaction data of the account holder. Database 104 may include multiple databases, each one of which stores transaction data relating to a different account of the account holder, permitting the system 100 to implement multiple programs offered by multiple service providers for multiple different account types.

The previous and more recent transaction data are sent from databases 102 and 104, respectively, to the rules engine 106 where they are processed according to rules defined by the account provider to determine an incentive and/or reward level for the account holder. In many instances the rules may be generated from the retention, resubscription and loyalty programs established by the account provider. For example, rules generated by a program to periodically increase a cash back reward level may include analyzing the account status data to determine an anniversary date upon which an account holder may be eligible for an increased reward level. The rules may also include analyzing the transaction data to determine whether a threshold transaction level (e.g., dollar volume) was met in the prior year to qualify the account holder for a reward level increase.

Embodiments of the invention allow the rules in rules engine 106 to be updated by the account provider via a computer network, such as the Internet. Embodiments of these rules management systems are described in detail in U.S. patent application Ser. No. 10/271,875, by Van Beaumont, et al., and titled "RULES MANAGEMENT SYSTEMS AND METHODS", the entire contents of which is hereby incorporated by reference for all purposes.

The rules engine 106 may be used to determine a new or enhanced reward level that will be applied in real time to an ongoing transaction. For example, a point-of-sale (POS) transaction device 108 may send information about an ongoing transaction to the rules engine 106, where a new or enhanced reward determined by the engine 106 may be applied to the transaction. For example, a rewards program may call for a new or enhanced merchandise discount when an account holder meets a threshold transaction frequency at a particular merchant (or group of merchants). When the rules engine 106 determines that an ongoing purchase meets the threshold to qualify for the discount, the discount may be applied at the point of sale before the transaction is completed. Alternatively, the rules engine 106 may report the discount to a transaction account processing system (not shown) that may apply it as a credit deducted from the outstanding balance owed by the account holder at the end of a statement period.

The rules engine 106 may also report information to account holders informing them of new incentives and reward level changes in one or more of their accounts. In some embodiments, the rule engine 106 reports the information directly to the account holder. In other embodiments, the rules engine 106 sends the message to a reporting system 200 like the one shown in FIG. 2.

The reporting system 200 can report the information via multiple kinds of media including electronically, by fax, and by mail, among other media. In the embodiment shown, the rules system 100 sends the message information to a reporting computer 204 via a communications network 208 (e.g., a financial network, a secure Internet connection, etc.). The reporting computer 204 is configured with communications protocols that permit interaction with a variety of different distribution facilities 224 depending on how the reporting information is to be distributed to the account holder. The message medium may be selected by the rules engine if specified, or the reporting computer 204. For example, if the rules engine specifies that the message be distributed electronically, the reporting computer 204 may instruct an electronic-mail preparer 212 to send prepare and send an email message to the account holder. The electronic-mail preparer 212 may be configured to format the reporting information so that it is suitable for electronic communication. Actual distribution to the account holder may be achieved by using the Internet 228 so that the formatted reporting information may be retrieved using a device 240 connected to the Internet, such as a personal computer, handheld personal digital assistant, etc. In some instances, the formatted message may be sent directly to an email account of the account holder, while in other instances, it will be made accessible to the account holder on an Internet website, perhaps with a notification sent to the account holder's email account as a reminder that it has been posted.

Similarly, if a particular distribution is to be made by facsimile, a fax preparer 216 may be used to format the reporting information for faxing over a telephone communications network 232 to the account holder's fax receiver 244. The fax receiver 244 may be a dedicated fax machine, or another device with the capacity for receiving faxes, such as a personal computer. Alternatively, if the distribution is to be made by post, a hard-copy mail preparer 220 may be used to generate and prepare a paper copy for delivery to the postal distribution system 236 and receipt at the customer's hard-copy mail receiver 248.

It should be noted that each of the distribution facilities 224 includes the capability of adding additional material to a message about a new incentive or changed reward level in an account. For example, the distribution facilities 224 may be responsible for sending periodic account balance statements at the end of cycle times, and the incentive/reward information may be incorporated in (or included with) these statements.

Figure 2:
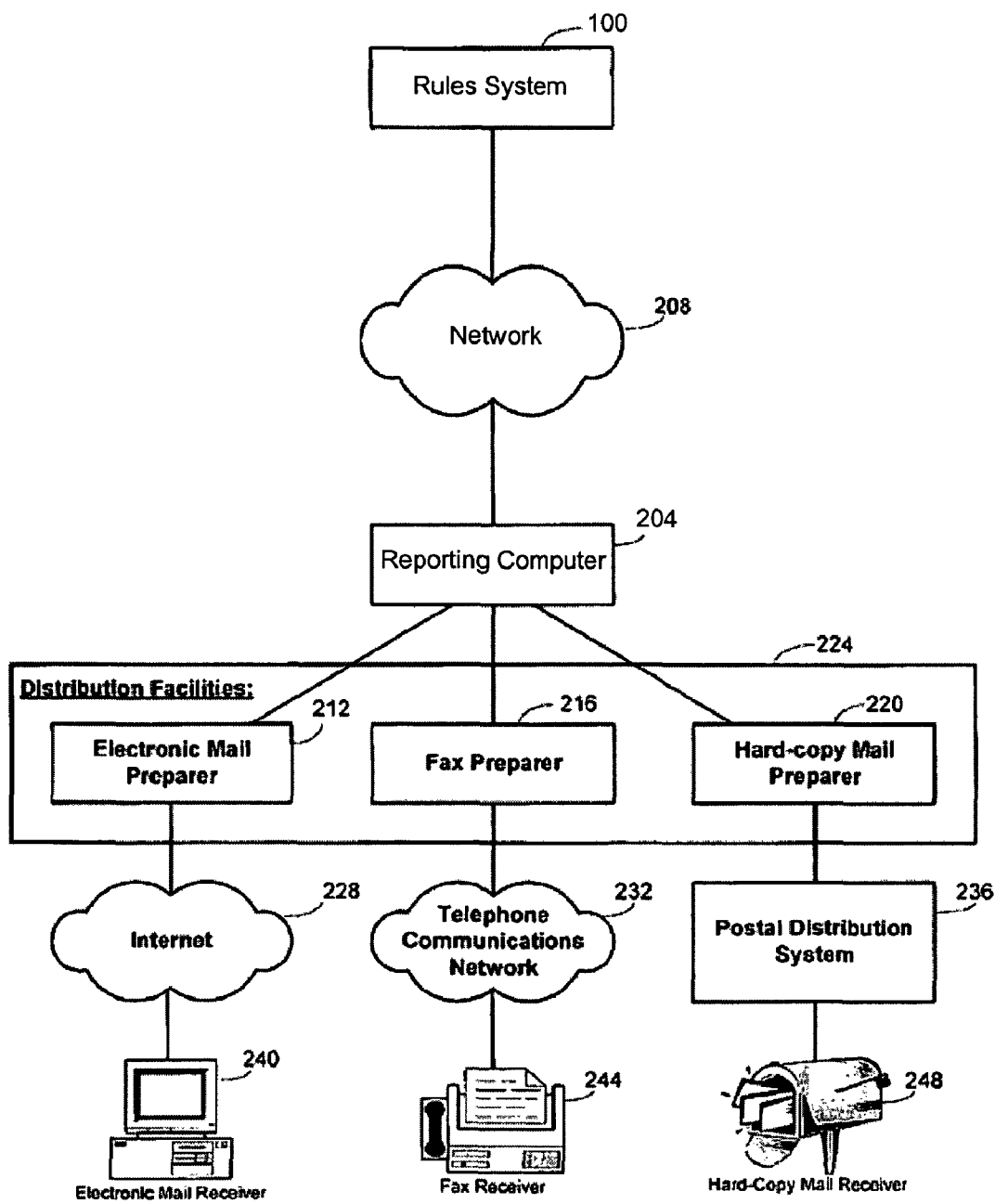
FIG. 2 is a block diagram representation of a reporting system that distributes information to account holders according to embodiments of the invention.

It should also be noted that the identification of certain types of distribution facilities 224 in FIG. 2 is intended only to be for purposes of illustration and is not intended to be exhaustive. Alternative distributions methods may be used, including distributions by voice and other methods known to those of skill in the art. Furthermore, the distribution facilities 244 may include language-translation capabilities so that the distribution may be in any desired language, including languages readable by the blind such as Braille.

Figure 3:
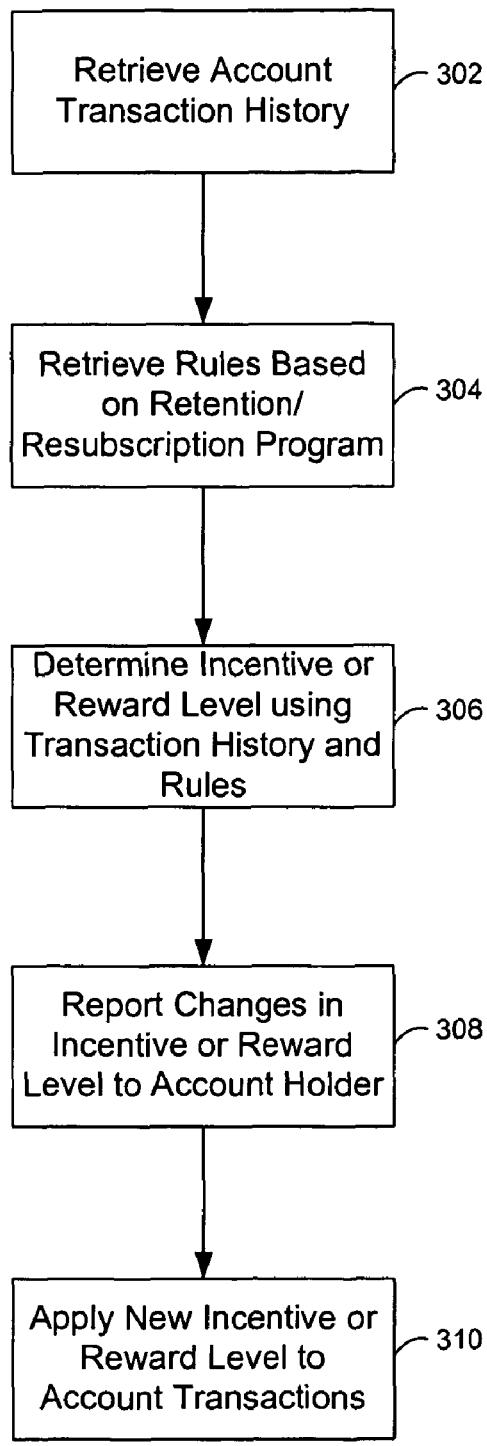
FIG. 3 is a flowchart illustrating steps in methods of retaining and resubscribing account holders according to embodiments of the invention.

FIG. 3 is a flowchart illustrating steps in methods of retaining and resubscribing account holders 300 according to embodiments of the invention. The method 300 includes retrieving the transaction history of an account 302 which may include information such as transaction or payment dates, locations, amounts, merchant information, vendor information, service provider information, among other kinds of information. The transaction history may also include information on a good or service purchased in the transaction, such as a general classification (e.g., food, clothing, entertainment, etc.) and/or more specific information (e.g., milk, shoes, movie tickets).

The method also includes retrieving rules based on a retention or resubscription program associated with the account 304. In some embodiments, these rules including incrementing a reward level from one time segment (e.g., a month, quarter, half year, full year, etc.) to the next. The incremental increases may be capped at a highest rewards level reached in one of the segments, and maintained at that level until an event occurs, such as the end of a promotion period, or having the account activity drop below a pre-defined level. The account history and rules may then be used to determine an incentive or reward level 306.

Using the example of the cash back rewards program for a credit card provider described above, the cash back level may be raised from 1% to 5% over a length of time of four years by incrementing the level 1% per yearly time segment (assuming the card holder qualifies for the increased reward). Thus, between two consecutive annual time segments a qualifying card holder will go from a first cash back level to a second, cash back level that is 1% higher than the first. After the fourth segment, a qualifying card holder will reach the 5% cash back level and stay at that level for future time segments until the program ends or the account no longer meets the requisite conditions to stay at the highest cash back level.

When a determination is made to change an incentive or reward level, this information may be reported to the account holder 308 by a variety of systems and media. For example, the information may be reported to the account holder by telephone, fax, email, regular mail, Internet website, etc. In addition, the new incentive and rewards levels may be applied to transaction conducted with the account 310. The new level may be applied immediately to all future transactions, or may be applied after a designed date in the future. In some embodiments, the new reward level may be applied retroactively to previous transactions going back to designed date in the past. In some embodiments, the new reward level may be applied to a qualifying subset of transactions (e.g., purchases of qualifying goods or services, purchases from qualifying merchants, etc.) conducted with the account.

Figure 4:
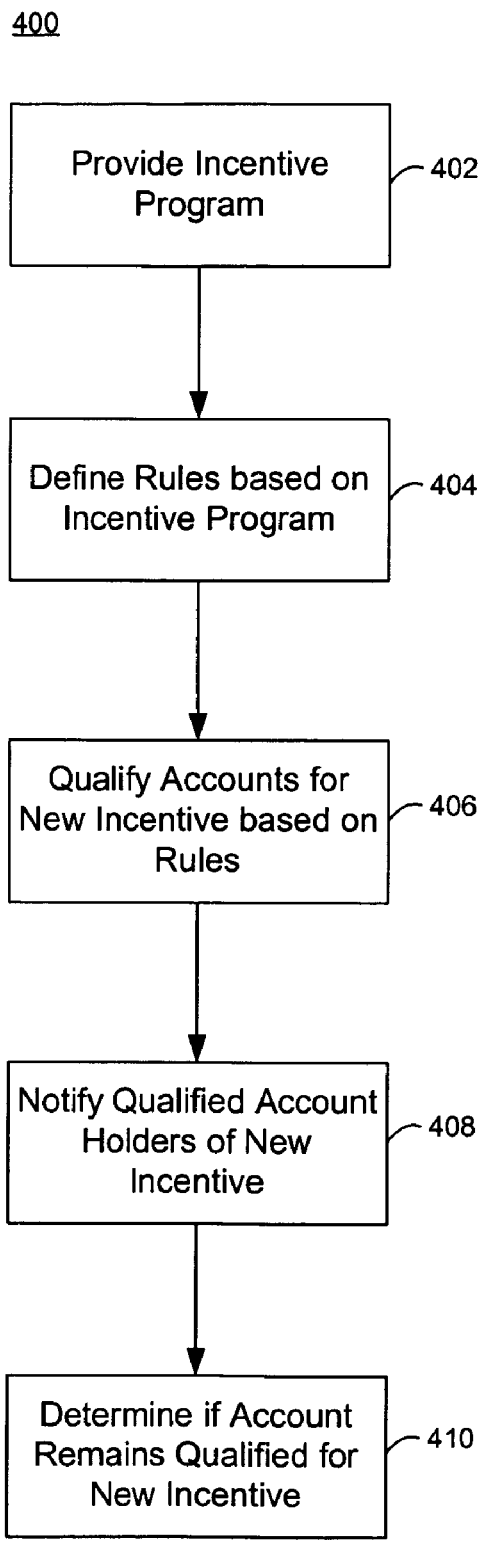
FIG. 4 is a flowchart illustrating steps in methods of providing incentives to customers according to embodiments of the invention.

Referring now to FIG. 4, a flowchart shows steps in methods of providing incentives to customers according to embodiments of the invention. These embodiments include providing an incentive program 402 that allows qualifying account holders to receive an incentive. Some examples of incentive programs may include programs designed to get the account holder to conduct larger valued transactions with the account, conduct transactions more frequently with the account, conduct transactions with favored merchants, vendors, service providers, etc., and pay down balances in the account with larger and/or more frequent payments, among others. Incentive programs may also be designed to encourage an account holder to renew or resubscribe to the account service provider.

The incentive programs may be used to define rules for when an account holder qualified for the incentive 404. These rules may then be applied to a set of accounts to determine which accounts qualify for the new incentive 406. Qualified account holders may be notified of the new incentive 408 in a variety of ways, including a telephone message, an email, a letter, a fax, etc. The notification may be incorporated with additional information about the account, such as in an account balance statement the account holder receives at the end of a cycle time (i.e., statement period).

Incentives may include one-time cash gifts, merchandise discounts, fee waivers, etc., and they may also include continuing incentives such as a lower interest rate, increased cash back level, etc. For continuing incentives, the method may also include a periodic determination to see if the account remains qualified for the incentive 410. For example, if an account holder is offered an increased cash back reward level for depositing a certain amount of money or value into an account (e.g., checking account) associated with a debit card or stored value card, the account balance may be rechecked periodically to determine if the account holder has kept that amount of money or more in the account. Failure to do so may result in the incentive cash back reward level dropping back to a non-incentive level.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A method of communicating a renewal incentive for an active expiring financial account to a user of the financial account, the method comprising:
   identifying, with a host computer, a renewal date for the active expiring financial account;
   calculating, using the host computer, whether the financial account qualifies for the renewal incentive based on account history of the active expiring financial account; and
   sending renewal data to the user about the renewal date, and the renewal incentive, for the financial account,
   wherein the renewal incentive is effective upon user renewal of the financial account, and the renewal incentive comprises a new discount or rebate of a portion of a transaction amount, the new discount or rebate being larger than a current discount or rebate;
   and wherein calculating whether the financial account qualifies for the renewal incentive based on account history comprises calculating whether the financial account qualifies for the renewal incentive based at least in part on the size and frequency of purchase transactions conducted with the account.

2. The method of claim 1, wherein with the user is sent the renewal data before the renewal date.

3. The method of claim 1, wherein the user is sent the renewal data by telephone, fax, email or mail.

4. A method of communicating a renewal incentive for an active expiring financial account to a user of the financial account, the method comprising:
   identifying, with a host computer, a renewal date for the active expiring financial account;
   calculating, using the host computer, whether the financial account qualifies for the renewal incentive based on account history of the active expiring financial account; and
   sending renewal data to the user about the renewal date, and the renewal incentive, for the financial account,
   wherein the renewal incentive is effective upon user renewal of the financial account, and the renewal incentive comprises an enhancement over a current feature for the financial account;
   and wherein calculating whether the financial account qualifies for the renewal incentive based on account history comprises calculating whether the financial account qualifies for the renewal incentive based at least in part on the size and frequency of purchase transactions conducted with the account;
   and wherein the current feature is a cash-back percentage of transaction amounts, and the renewal incentive is a new cash-back percentage that is larger than the feature condition.

5. A method of communicating a renewal incentive for an active expiring financial account to a user of the financial account, the method comprising:
   identifying, with a host computer, a renewal date for the active expiring financial account;
   calculating, using the host computer, whether the financial account qualifies for the renewal incentive based on account history of the active expiring financial account; and
   sending renewal data to the user about the renewal date, and the renewal incentive, for the financial account,
   wherein the renewal incentive is effective upon user renewal of the financial account, and the renewal incentive comprises an enhancement over a current feature for the financial account;
   and wherein calculating whether the financial account qualifies for the renewal incentive based on account history comprises calculating whether the financial account qualifies for the renewal incentive based at least in part on the size and frequency of purchase transactions conducted with the account;

and wherein the current feature is a number of points earned per dollar transacted with the account, and the renewal incentive is a new number of points per dollar transaction that is larger than the current feature.

6. A method of communicating a renewal incentive for an active expiring financial account to a user of the financial account, the method comprising:
   identifying, with a host computer, a renewal date for the active expiring financial account;
   calculating, using the host computer, whether the financial account qualifies for the renewal incentive based on account history of the active expiring financial account; and
   sending renewal data to the user about the renewal date, and the renewal incentive, for the financial account,
   wherein the renewal incentive is effective upon user renewal of the financial account, and the renewal incentive comprises an enhancement over a current feature for the financial account;
   and wherein calculating whether the financial account qualifies for the renewal incentive based on account history comprises calculating whether the financial account qualifies for the renewal incentive based at least in part on the size and frequency of purchase transactions conducted with the account;
   and wherein the current feature is an interest rate for a balance owed in the account, and the renewal incentive is a new interest rate that is lower than the current feature.

7. The method of claim 1, wherein the account is selected from the group consisting of a savings account, a checking account, a mortgage account, a credit card account, a mutual fund account, a home-equity loan account, a certificate of deposit account, a health care spending account, and a utility account.

8. The method of claim 7, wherein the utility account is selected from the group consisting of an electric power account, a natural gas account, a heating oil account, and a water service account.

9. A method of providing improved reward information to a holder of a financial account, the method comprising:
   receiving at a computer-based rules engine information about a first reward that is a first discount or rebate of a portion of a transaction amount;
   determining with the computer-based rules engine if a customer qualifies for an improved reward that is a new discount or rebate that is equal to or greater than the first discount or rebate; and
   reporting from the computer-based rules engine to the account holder an eligibility to receive the improved reward, wherein the improved reward is reported to the account holder with information about renewing or re-subscribing to the financial account, and wherein the improved reward is a renewal incentive effective upon user renewal of the financial account;
   wherein determining if the customer qualifies for an improved reward that is equal to or greater than the first reward further comprises determining if the customer qualifies for an improved reward based at least in part on account history information including the size and frequency of purchase transactions conducted with the account.

10. The method of claim 9, wherein the account includes an existing reward program, and the new reward improves on the existing reward program.

11. A method of calculating reward levels in a host computer system operable to access account data associated with a user of a financial account, the method comprising:
   determining, using a computer-based rules engine, whether the account user qualifies for an improved reward, the determination based at least in part on information about the history of the financial account including the size and frequency of purchase transactions conducted with the account;
   dividing, using the computer-based rules engine, a length of time into a plurality of future segments, including a first segment and a second segment;
   calculating, using the computer-based rules engine, a first and second reward level, wherein the second reward level is greater than the first reward level;
   associating, at the computer-based rules engine, the first reward level with the first segment, and the second reward level with the second segment; and
   communicating, from the computer-based rules engine to the account user, reward data comprising the first reward level associated with the first segment and the second reward level associated with the second segment, wherein the reward data is communicated to the account user with information about renewing or re-subscribing to the financial account, to inform the user of escalating rewards that could be received in the future should the user renew the financial account.

12. The method of claim 11, wherein the first and second segments are consecutive in time.

13. The method of claim 11, wherein the first and second segments are of equal time.

14. The method of claim 11, wherein the plurality of segments comprises a last segment of time that ends when the account is no longer active.

15. The method of claim 14, wherein the last segment of time is associated with a final reward level that is higher than the first and second reward levels.

16. The method of claim 11, wherein the method comprises associating a third reward level with the first segment when activity in the account exceeds a threshold transaction level.

17. The method of claim 16, wherein the threshold transaction level comprises a threshold transaction amount, or threshold transaction frequency.

18. The method of claim 1, wherein calculating whether the financial account qualifies for the renewal incentive based on account history comprises calculating whether the financial account qualifies for the renewal based at least in part in the account user's credit history.

19. The method of claim 9, wherein determining if the customer qualifies for an improved reward that is equal to or greater than the first reward further comprises determining if the customer qualifies for an improved reward based at least in part on the customer's credit history.

20. The method of claim 11 wherein the determination is based at least in part on the account user's credit history.

* * * * *